(12) United States Patent
Yoshizawa

(10) Patent No.: US 9,066,037 B2
(45) Date of Patent: Jun. 23, 2015

(54) THRESHOLD MATRIX GENERATION DEVICE AND METHOD FOR GENERATING THRESHOLD MATRIX FOR GENERATING THRESHOLD MATRIX OF PREDETERMINED SIZE USED FOR HALFTONE PROCESSING OF MULTITONE IMAGE DATA USING DITHERING METHOD

(75) Inventor: Masanori Yoshizawa, Tokyo (JP)

(73) Assignee: KONICA MINOLTA BUSINESS TECHNOLOGIES, INC., Tokyo (JP)

( * ) Notice: Subject to any disclaimer, the term of this patent is extended or adjusted under 35 U.S.C. 154(b) by 182 days.

(21) Appl. No.: 13/535,514

(22) Filed: Jun. 28, 2012

(65) Prior Publication Data

US 2013/0010339 A1    Jan. 10, 2013

(30) Foreign Application Priority Data

Jul. 6, 2011    (JP) ................................. 2011-149767

(51) Int. Cl.
| | |
|---|---|
| H04N 1/46 | (2006.01) |
| H04N 1/405 | (2006.01) |
| H04N 1/403 | (2006.01) |
| H04N 1/60 | (2006.01) |
| G06K 15/00 | (2006.01) |
| H04N 1/407 | (2006.01) |

(52) U.S. Cl.
CPC .................................. H04N 1/4051 (2013.01)

(58) Field of Classification Search
CPC .................... H04N 1/46; H04N 1/52
See application file for complete search history.

(56) References Cited

U.S. PATENT DOCUMENTS

| | | | | |
|---|---|---|---|---|
| 2003/0020935 A1* | 1/2003 | Morimatsu | ..................... | 358/1.9 |
| 2005/0195440 A1* | 9/2005 | Inoue | ............................ | 358/3.14 |
| 2006/0221400 A1* | 10/2006 | Sugizaki | ...................... | 358/3.13 |
| 2009/0174908 A1* | 7/2009 | Asai | .............................. | 358/3.06 |
| 2009/0225372 A1* | 9/2009 | Ikeda | ........................... | 358/3.13 |
| 2009/0231629 A1* | 9/2009 | Asai | ............................. | 358/3.06 |

FOREIGN PATENT DOCUMENTS

| | | |
|---|---|---|
| EP | 1571826 A2 | 7/2005 |
| JP | 04-249474 | 9/1992 |

(Continued)

OTHER PUBLICATIONS

Japanese Office Action, Notification of Reasons for Refusal, Patent Application No. 2011-149767, drafting date: Nov. 12, 2013 (2 pages).

(Continued)

*Primary Examiner* — Fred Guillermety
*Assistant Examiner* — Henok A Shiferaw
(74) *Attorney, Agent, or Firm* — Lucas & Mercanti, LLP

(57) ABSTRACT

A threshold generation device sets a ratio of a length along a main scanning direction to a length along a sub-direction based on a relation between image reproducibility in the main scanning direction and image reproducibility in the sub-direction of an image processing device for forming an image on a paper based on an image data obtained by the halftone processing. The device determines spatial frequency characteristics having a domain of an ellipse shape having set major axis and minor axis as peak values. The device sets a threshold value of each pixel of the threshold matrix in accordance with the determined spatial frequency characteristics.

7 Claims, 14 Drawing Sheets

(56) References Cited

FOREIGN PATENT DOCUMENTS

| JP | 2005-286999 | 10/2005 |
|----|-------------|---------|
| JP | 2005-318543 | 11/2005 |
| JP | 2006-311532 | 11/2006 |
| JP | 2009-303185 | 12/2009 |
| JP | 2011-023895 | 2/2011  |

OTHER PUBLICATIONS

English translation of Japanese Office Action, Notification of Reasons for Refusal, Patent Application No. 2011-149767, drafting date: Nov. 12, 2013 (3 pages).

Chinese Office Action, Application No. 201210230006.9. Issuing Date: Jul. 2, 2014 and English translation (total of 14 pages).

* cited by examiner

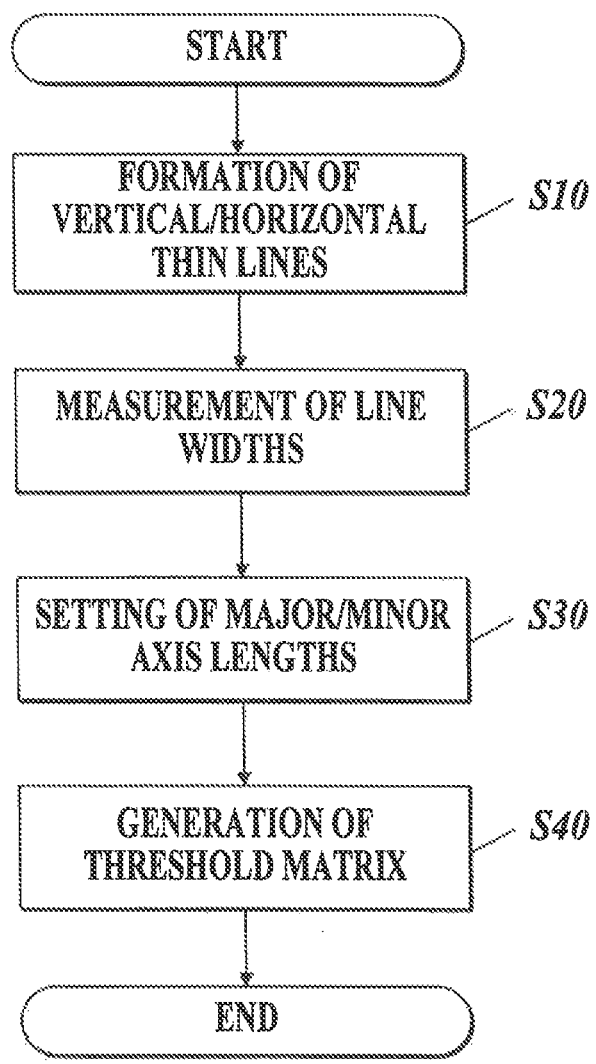

FIG.10
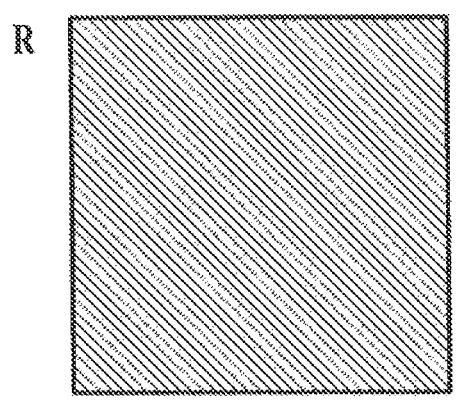
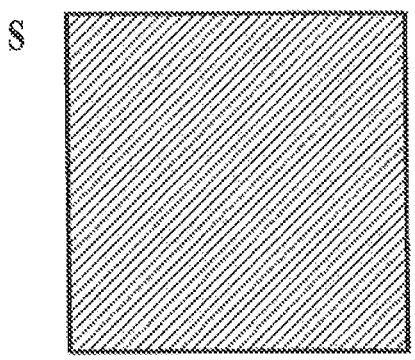

THRESHOLD MATRIX GENERATION DEVICE AND METHOD FOR GENERATING THRESHOLD MATRIX FOR GENERATING THRESHOLD MATRIX OF PREDETERMINED SIZE USED FOR HALFTONE PROCESSING OF MULTITONE IMAGE DATA USING DITHERING METHOD

BACKGROUND

1. Field of the Invention

The present invention relates to a threshold matrix generation device and a method for generating a threshold matrix for generating a threshold matrix of a predetermined size used for halftone processing of a multitone image data using a dithering method.

2. Description of Related Art

A FM (Frequency Modulation) screen is known as an expressing method of intermediate tones for an image formation. And a screening process (half-toning process) by a dithering method using a threshold matrix is known to perform the FM screening. The process does quantization of an image data by arranging threshold (values) matrix corresponding to the multi-toned image data like tiles and outputting results of comparison between the image data and the threshold matrix.

With regard to a conventional image processing device for forming an image on a paper, reproducibility of the device may become different between a main scanning direction that is orthogonal to a paper feeding direction and a subscanning direction that is orthogonal to the main direction due to its characteristics. When performing the screening process to an image using the FM screen and reproducing the image on a paper, a region may be generated where collapse or missing (friar) of dots occurs widely due to the difference of reproducibility between the main direction and the subscanning direction.

For example, an image processing device of an electrophotography system, in which a laser beam is scanned using a polygon mirror, etc. in a main scanning direction to form an electrostatic latent image on a photoconductive drum and the latent image is developed by adhering toner, has a tendency of higher reproducibility of dots in the subscanning direction than the main scanning direction. FIG. 12 shows an example of dots reproducibility of an electro-photographic image processing device. The figure has a size of 128×128 pixels and the dots are reproduced in 50% of tone value using threshold matrix for an FM screen having spatial frequency characteristics whose frequency domain is circular. In FIG. 12, as shown by region A, the dots tend to collapse by a toner when the figure contains main components along the main scanning direction (fine horizontal lines, for example). On the other hand, the dots do not tend to collapse by a toner when the figure contains main components along the subscanning direction (fine vertical lines, for example), but tend to generate white patch.

In the case where an image processing device having such characteristics is used, a screen pattern having a region P where dots are collapsed and a region Q where dots are missing, as shown in FIG. 13, is repeatedly arranged like tiles even when an image is processed by threshold matrix for the FM screen having no periodicity as an image data. As a result, the collapse and missing of dots are repeatedly reproduced, as shown in FIG. 14, and the reproduced image in such a way is recognized as moiré fringes which are an undesirable pattern having periodicity.

In relation to the above mentioned problem, a technique for making conventional threshold matrixes is disclosed is disclosed in JP2006-311532A. In the document 1, FM screen threshold matrixes that have spatial frequency characteristics whose frequency domains are elliptical and the directions of the major axes of the elliptical figures of colors differ from each other are generated so as to reduce graininess in a color image.

SUMMARY OF THE INVENTION

The technique disclosed in JP2006-311532A can be applied to a compound color of two or more colors. However, the difference of reproducibility between main direction and subscanning direction is not considered and thus moiré fringes (pattern) may be created even when the technique is applied.

The present invention is made on the basis of the background above mentioned and it is an object of the present invention to provide a threshold matrix generation device and a threshold matrix generating method that can generate a threshold matrix for a FM screen to reduce the occurrence of a moiré pattern.

For achieving an object, according to an aspect of the invention, a threshold matrix generation device for generating a threshold matrix having a specified size for use of halftone processing of a multi-tone image data using a dithering method is provided.

The device sets a ratio of a length along a main scanning direction to a length along a subscanning direction (sub-direction) based on a relation between image reproducibility in the main scanning direction and image reproducibility in the sub-direction of an image processing device for forming an image on a paper based on an image data obtained by the halftone processing. The device determines spatial frequency characteristics having a domain of an ellipse shape having set major axis and minor axis as peak values. The device sets a threshold value of each pixel of the threshold matrix in accordance with the determined spatial frequency characteristics.

According to the threshold matrix generation device above explained, preferably the relation between the image reproducibility in the main scanning direction and the image reproducibility in the sub-direction is a ratio of a width of a thin line running along the main direction to a width of a thin line running along the sub-direction.

According to the threshold matrix generation device above explained, preferably a length of each side of the threshold matrix is not more than 10 mm.

According to the threshold matrix generation device above explained, preferably the threshold matrix generation device can generate different threshold matrixes having different sizes each other, the matrixes correspond to two or more colors that the image processing device can reproduce.

For achieving an object, according to another aspect of the invention, a threshold matrix generation device for generating a threshold matrix for a FM (frequency modulation) screen pattern for each of different colors and having a specified size for use of a halftone processing of a multi-tone color image data using a dithering method is provided. The threshold matrix generation device can generate different threshold matrixes having different sizes each other that correspond to the different colors.

For achieving an object, according to another aspect of the invention, a threshold matrix generation method for generating a threshold matrix having a specified size for use of a halftone processing of a multi-tone image data using a dithering method is provided. The method includes:

a step of generating a specified image for determining reproducibility on a paper using an image processing device that can form an image on a paper based on an image data obtained by the halftone processing, a step of determining a relation between reproducibility of an image in a main scanning direction and reproducibility of an image in a sub-direction of the image processing device based on the image for determining reproducibility formed in the image generating step, and a step of generating a threshold matrix by setting a ratio of a length along the main direction to a length along the sub-direction based on the relation determined in the relation determining step, by determining a spatial frequency characteristics of a domain of an ellipse shape having set major axis and minor axis as peak values, and by setting a threshold value of each pixel of the threshold matrix in accordance with the determined spatial frequency characteristics.

For achieving an object, according to another aspect of the invention, a threshold matrix generation method for generating a threshold matrix for a FM (frequency modulation) screen pattern for each of different colors and having a specified size for use of a halftone processing of a multi-tone color image data using a dithering method is provided. The method includes a step of generating different threshold matrixes having different sizes each other corresponding to different colors.

Effect of the Invention

According to the present invention, it becomes possible to generate a threshold matrix for a FM screen to reduce occurrence of a moiré pattern.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein;

FIG. 3 is a flowchart for explaining an outline of making a threshold matrix, FIG. 10 is a drawing for explaining a size of a threshold matrix.

DETAILED DESCRIPTION OF THE PREFERRED EMBODIMENTS

Figure 1:
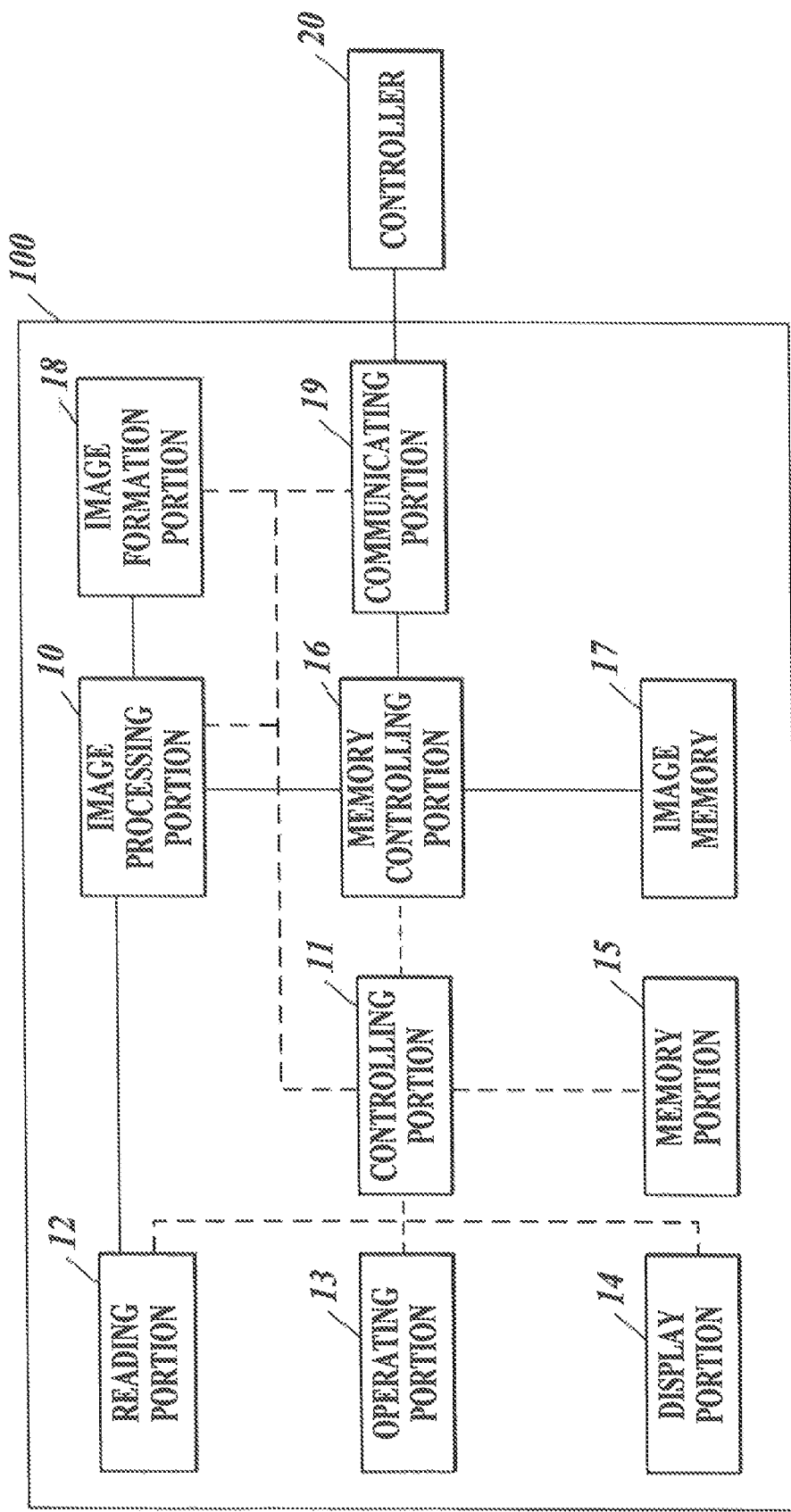
FIG. 1 is a functional structure of an image processing device.

An image processing device according to the present invention will be explained as an exemplary embodiment with reference to the drawings; however, the present invention is not limited to this embodiment shown in the drawings. Members having the same function or structure are designated by the same symbol and repeated explanations are omitted hereinafter.

FIG. 1 shows a functional structure of an image processing device 100. The image processing device 100 is a multi function peripheral (MFP) that can perform multiple functions such as a copy function, printing function, and the like.

As shown in FIG. 1, the image processing device 100 is connected to a controller 20. The controller 20 rasterizes a data of a PDL (Page Description Language) format sent from a personal computer, etc. as a subject to form an image and generates an image data of a bitmap format. The generated image data is sent to a communicating portion 19, that is, input to the image processing device 100. The image data input to the image processing device 100 is stored in an image memory 17. The controller 20 may be incorporated in the image processing device 100.

The image processing device 100 includes, for example, an image processing portion 10, controlling portion 11, reading portion 12, operating portion 13, display portion 14, memory portion 15, memory controlling portion 16, image memory 17, image formation portion 18 and communicating portion 19.

The controlling portion 11 is composed of a CPU (Central Processing Unit), RAM (Random Access Memory), and the like. The controlling portion 11 performs various kinds of operations in cooperation with various programs stored in the memory 15 and controls every portion in the image processing device 100 centrally.

The reading portion 12 is provided with a scanner having an optics and CCD (Charge Coupled Device), and scans a script optically and generates analog image signals. The generated image signals are output to the image processing portion 10.

The operating portion 13 is used for inputting operator's directions and is composed of various keys, a touch panel structured as the display portion 14 integrally, and the like. The operating portion 13 generates an operational signal corresponding to the inputting operation and outputs the signal to the controlling portion 11.

The display portion 14 displays an operation window on a screen in accordance with the control by the controlling portion 11.

The memory portion 15 stores parameters and/or setting data for processing beside various processing programs. The memory portion 15 may be a hard disc.

The memory controlling portion 16 controls an input/output of an image data to the image memory 17. For example, the memory controlling portion 16 makes the image memory 17 store an image data input from the communicating portion 19 and the image processing portion 10. The memory controlling portion 16 also reads an image data, which is directed by the controlling portion 11 to form an image, from the image memory 17 and outputs the image to the image processing portion 10.

The image memory 17 stores an image data. The image memory 17 may be a DRAM (Dynamic RAM).

The image formation portion 18 performs an image formation based on the image data for image formation input from the image processing portion 10. The image formation portion 18 performs an electrophotographic image formation and is composed of, for example, a paper feed portion, exposing portion, developing portion, transfer portion and fixing portion. The image formation portion 18 can form a color image by four colors of Y (yellow), M (magenta); C (cyan) and K (black). When forming an image, the image formation portion 18 forms an electrostatic latent image on a photoconductive drum by making the exposing portion radiate a laser beam on the drum in accordance with PWM (Pulse Width Modulation) image signals obtained by PWM conversion of the image. The developing portion develops the latent image using a toner to form a toner image on the drum, the transfer portion transfers the toner image on a paper fed by the paper feed portion, and the fixing portion fixes the transferred image.

The communicating portion 19 is provided with a communication interface and communicates with the controller 20. The communicating portion 19 receives the subject image data for image formation from the controller 20 and outputs the data to the memory controlling portion 16.

The image processing portion 10 performs a color conversion processing and a correction processing such as a brightness correction. The image processing portion 10 converts analog image signals digitally to produce a digital color image data of four colors of Y, M, C and K, and outputs the data to the memory controlling portion 16. The image data is stored in the image memory 17 by the memory controlling portion 16.

After that, when an image formation instruction is output from the controlling portion 11, the memory controlling portion read the image data stored in the image memory 17 and outputs the data to the image processing portion 10. The image processing portion 10 performs image processing which is necessary for the image formation, such as a gamma correction for concentration correction of the image and a screening to convert multi-tone image pixels into binarized pixels, and generates image data for image formation.

Figure 2:
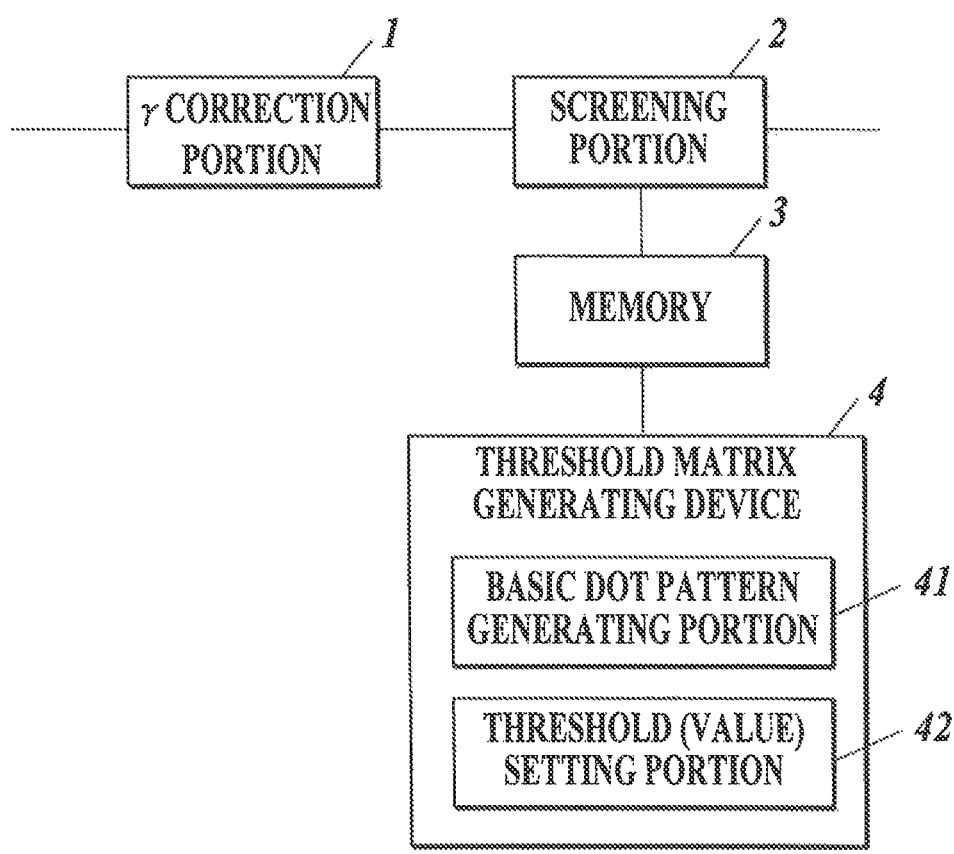
FIG. 2 is a part of structure of an image processing device including a threshold matrix generation device according to an exemplary embodiment of the present invention.

Next, a functional structure of the image processing portion 10 that functions mainly for creation of an image data for image formation will be explained with reference to FIG. 2.

The image processing portion 10 includes a gamma correction portion 1, screening portion 2, memory 3 and threshold matrix generation device 4.

The gamma correction portion 1 performs gamma correction to the input image data. The gamma correction is performed such that a pixel value of each pixel of the input image data is converted into a corrected value using a "look up table (LUT)" defining corrected output pixel values corresponding to input pixel values. The gamma correction is performed for each color of Y, M, C and K. The gamma corrected image data is output to the screening portion 2.

The screening portion 2 performs an image screening process, which is a binarization of each pixel, of the image data input from the gamma correction portion 1 by a dithering method using a threshold matrix of FM screen stored in the memory 3. In the screening, the screening portion 2 scans the image and assigns threshold matrix, compares each pixel value of the image with a threshold value assigned to the threshold matrix and binarizes each pixel value by the condition whether or not the pixel value is the same or larger than the threshold value. The screening is performed for each color of Y, M, C and K.

The memory 3 stores the threshold matrixes generated by the threshold matrix generation device 4. The threshold matrixes are prepared for each color of Y, M, C and K. In this embodiment, as explained later, sizes of the threshold matrixes corresponding to the colors are different each other.

The threshold matrix generation device 4 includes a basic dot pattern generating portion 41 and a threshold (value) setting portion 42, and generates a threshold matrix of a FM screen and outputs the matrix to the memory 3. A method for generating a threshold matrix will be explained later. The threshold matrix generation device 4 can be composed of hardware such as an application specific integrated circuit (ASIC), and the like or of software such that, for example, the controlling portion 11 executes a threshold matrix generating program stored in the memory portion 15 to generate a threshold matrix.

The basic dot pattern generating portion 41 generates a dot pattern as a basis for setting a threshold level of the threshold matrix (designated as a "basic dot pattern").

The threshold setting portion 42 sets a threshold level at each pixel position of the threshold matrix on the basis of the basic dot pattern generated by the basic dot pattern generating portion 41.

An outline of a method for generating a threshold matrix for use of the image processing device 100 structured as explained above is explained with reference to FIG. 3.

Figure 4A:
FIGS. 4A and 4B are drawings for explaining thin lines reproduced by an image processing device.
Figure 4B:
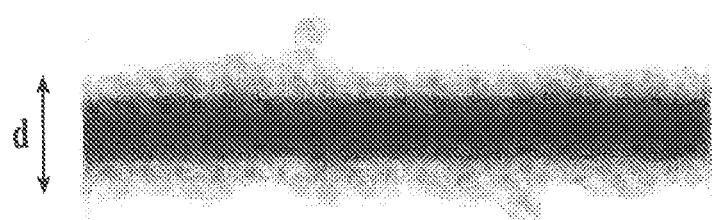

At first, thin lines are reproduced by forming a vertical thin line and a horizontal thin line on a paper using the image processing device 100 (step S10). That is, the image processing device 100 forms a thin line along a main scanning direction (main direction) that is orthogonal to a paper feeding direction and a thin line along a subscanning direction (sub-direction) that is orthogonal to the main direction. An image of the thin lines on a paper is also designated as an "image for defining reproducibility". FIG. 4 is an example of the thin lines reproduced on a paper. FIG. 4A is an example of a reproduced thin line along the sub-direction and FIG. 4B is an example of a reproduced thin line along the main direction. The drawings indicate reproduced and enlarged thin lines of two-pixel width in a dot density of 1200 dpi.

Next, a width of each thin line reproduced on a paper is measured (step S20). For example, a measured width of the thin line along the sub-direction is "c" and a measured width of the thin line along the main direction is "d". A relation between the widths can be expressed as $d=kc$. In other words, the width of the line along the main direction is k times of the width of the line along the sub-direction. When a measured width of the line along the main direction is larger than that along the sub-direction, the relation is expressed as $d=kc$ ($k>1.0$).

Next, on the basis of the measured width of each thin line above explained, lengths of a major axis and a minor axis of an ellipse are set (step S30) so as to determine spatial frequency characteristics having an elliptical frequency domain as explained later.

A theory for setting the lengths of major and minor axes is explained.

In the case where an electrophotography is applied, in which an image is formed by scanning a light source such as a laser beam in a main scanning direction on a photoconductive drum such as the image processing device 100 according to this exemplary embodiment, for example, a width of a line running along a sub-direction can be considered as a reproduction of main directional component that is orthogonal to the sub-direction. Therefore, it will be possible to reproduce the thin line thinner by utilizing the reproducibility of the main direction. In other words, a width of the line becomes thick when it is drawn in a direction parallel to the scanning (main) direction and becomes thin when drawn in a direction orthogonal to the main direction.

Figure 5:
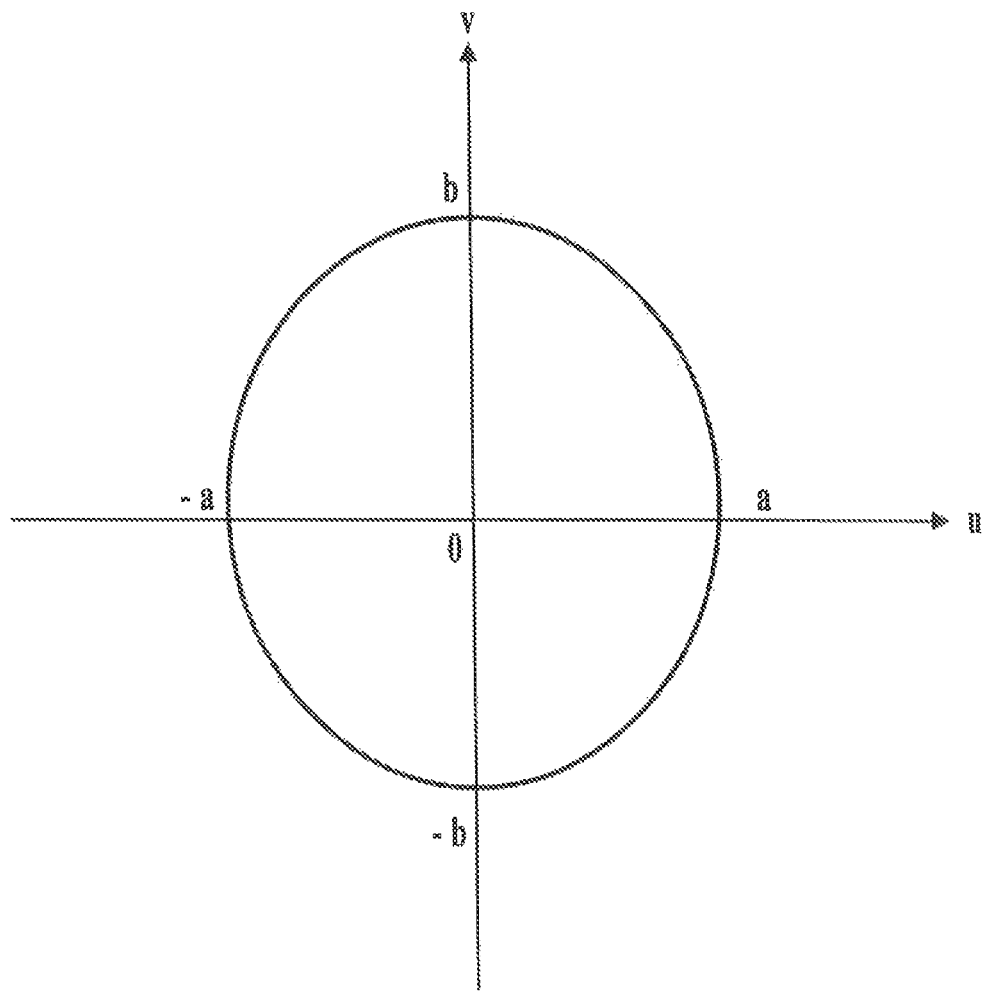
FIG. 5 is a drawing for explaining spatial frequency characteristics.

In this exemplary embodiment, on the basis of the above feature, spatial frequency characteristics having frequency domain of an ellipse shape are determined and a threshold matrix is obtained based on the characteristics. Ideal spatial frequency characteristics can be determined such that a minor axis, having an arbitrary length "a", of the ellipse shape of the frequency domain is arranged parallel to the main direction "u" and a major axis having an arbitrary length "b" is arranged parallel to the sub-direction "v" as shown in FIG. 5. The length "b" of the major axis depends on the line width ratio of the vertical line to the horizontal line obtained as explained above. For example, the major axis has the length "b" of k times of the length "a" of the minor axis. By using the spatial frequency characteristics obtained as above explained, it becomes possible to generate a threshold matrix by which a dot formation frequency (tendency) in the sub-direction becomes smaller than that in the main direction. In the case where the width of the reproduced line along the main direction is smaller than that of the line along the sub-direction, spatial frequency characteristics are determined such that an ellipse-shaped frequency domain has a minor axis that is arranged parallel to the sub-direction "v" and a major axis arranged parallel to the main direction "u".

After setting the lengths of major axis and the minor axis as explained above, a threshold matrix is created by the threshold matrix generation device 4 (step S40).

Figure 6:
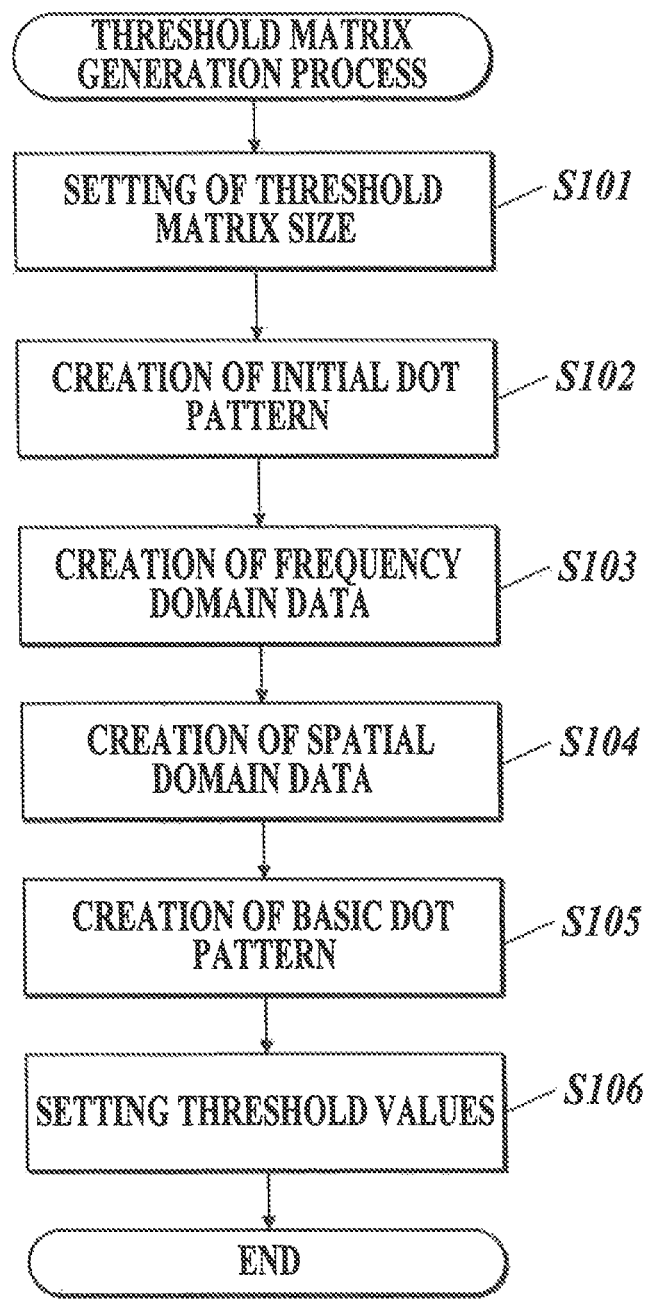
FIG. 6 is a procedural flowchart for making a threshold matrix.

Next, a method of creation of a threshold matrix by the threshold matrix generation device 4 is explained with reference to FIG. 6.

At first, the basic dot pattern generating portion 41 sets a size of the threshold matrix (step S101). The basic dot pattern generating portion 41 sets sizes of the threshold matrixes corresponding to the colors of Y, M, C and K. As explained above, the size of the threshold matrix for each color differs with each other. For example, the size of the matrix for the color K is 128×128 pixels, the size for Y color is 127×127 pixels, the size for M color is 125×125 pixels and the size for C color is 123×123 pixels. With regard to the sizes of the matrixes for the colors, the larger the lowest common multiple, the more difficult to recognize the moiré pattern when screen-processed images of every colors are superimposed because the periodicity of the screened pattern becomes larger. A shape of the threshold matrix is not necessarily a square of N×N pixels but can be a rectangular of N×M pixels. Or only a part of the threshold matrixes for multiple colors can be sized differently each other.

Next, the basic dot pattern generating portion 41 creates an initial dot pattern (step S102). The initial dot pattern has the same size and the same shape as the threshold matrix to be created. For example, random numbers are generated in the matrix by white noise, etc. and dots are allocated to pixel positions where the random numbers are generated. However, a method to create an initial dot pattern is not limited to the method above explained but any known methods can be applied. An initial dot pattern can be created in any intermediate tones. In this exemplary embodiment an initial dot pattern having 50% in tone value is created.

The basic dot pattern generating portion 41 creates frequency domain data on the basis of the initial dot pattern created as above explained (step S103). Specifically, at first the portion 41 performs a fast Fourier transform (FFT) processing to the created initial dot pattern. Next, the portion 41 calculates an aspect ratio from the lengths of the major and minor axes set as explained above. Then the portion 41 filters the FFT processed initial dot pattern by predetermined pattern frequency using a band pass filter (BPF) having the calculated aspect ratio and an elliptical angle. The elliptical angle is selected as, for example, 90 degrees when the major axis is parallel to the sub-direction. As a result, a frequency domain data having an elliptical frequency domain is created.

The portion 41 performs inverse Fourier transform processing to the frequency domain data obtained as explained above and creates spatial domain data (step S104).

The portion 41 creates a basic dot pattern having a predetermined tone value by comparing the obtained spatial domain data with predetermined intermediate tone value (step S105). A tone value for the basic dot pattern is arbitrary except the condition that the tone value is intermediate. In this exemplary embodiment the tone value is 50%, for example.

The threshold setting portion 42 sets threshold values of every pixel in the threshold matrix on the basis of the basic dot pattern created as explained above (step S106).

Specifically, the threshold setting portion 42 increases or decreases the dot according to an amount of the change of tone "δg" based on a tone value "g" of the basic dot pattern. At this time, the portion 42 does not change the dot arrangement in the original basic dot pattern when the tone value is increased by adding the amount "δg". In other words, when the dot is increased, the basic dot pattern is maintained and additional dots are added. On the other hand, when the tone value is decreased by the amount of "δg", an arrangement of original pixels in the basic dot pattern where dots are not formed is maintained. In other words, when dots are decreased, pixels which dots are not formed are maintained as they are, and existing dots are deleted so as to increase pixels which dots are not formed. The portion 42 generates a dot pattern corresponding to each dot rate in this manner.

In the case where the portion 42 further increases or decreases dots according to the amount of "δg" on the basis of a dot pattern having a tone value "g+δg", after creation of the dot pattern of the tone value "g+δg" processed (dots increased or decreased) according to the amount of "δg" based on the tone value "g" of the basic dot pattern, the dot pattern having the tone value "g+δg" generated previously is considered as a basic dot pattern.

For example, when the amount "δg" is 1%, the threshold setting portion 42 generates a dot pattern having a tone value of g+δg=51% and a dot pattern having a tone value of g-γg=49% based on a dot pattern having a tone value of g=50%. At the same time, the portion 42 sets threshold values corresponding to the pixels of the threshold matrix, where dots are formed or dots are removed, to values corresponding to the changed tone value. And the portion 42 generates, in a next processing, dot patterns having tone values of 52% and 48%, respectively, on the basis of the basic dot patterns having tone values of 51% and 49%, respectively. At the same time, the portion 42 sets threshold values for the threshold matrix in accordance with the processing. The similar processing is repeated and threshold matrixes are generated.

The threshold matrixes for the colors Y, M, C and K generated by the above fashion are stored in the memory 3.

Figure 7:
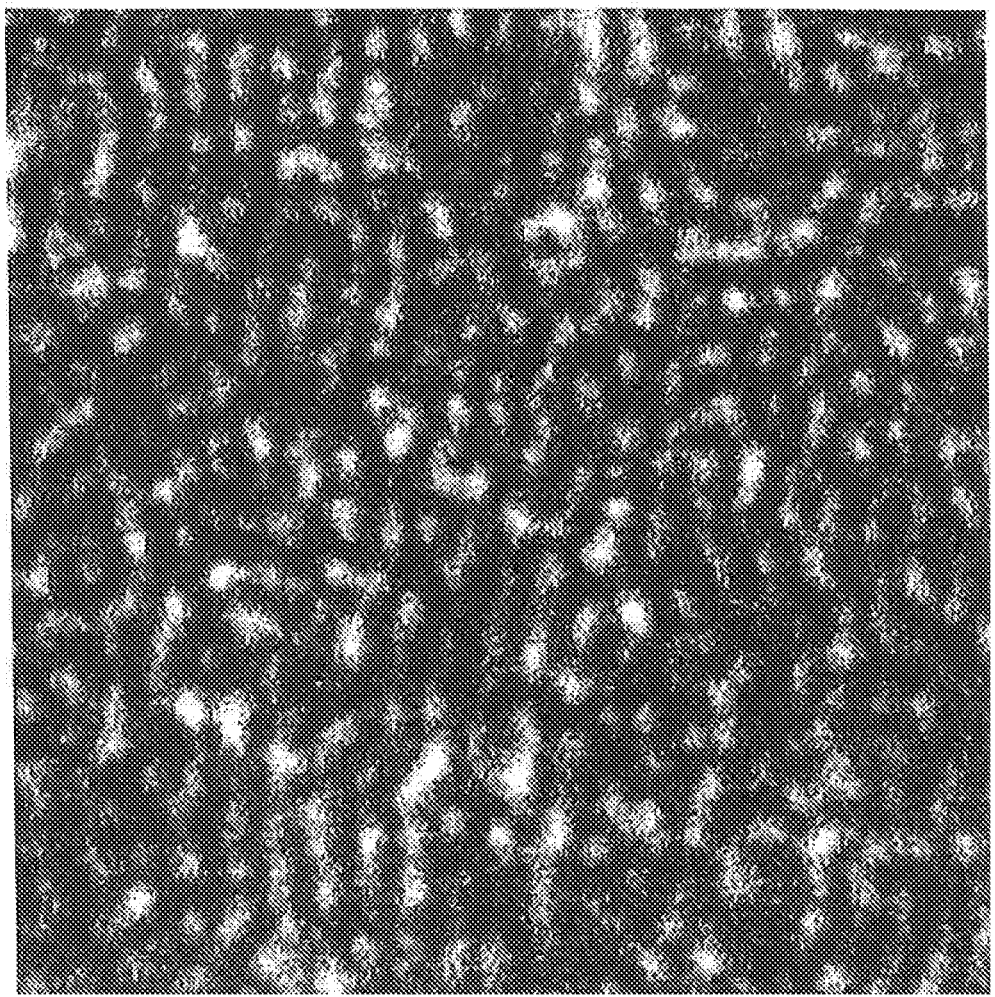
FIG. 7 is an image example reproduced using a threshold matrix made by an exemplary embodiment of the present invention.
Figure 12:
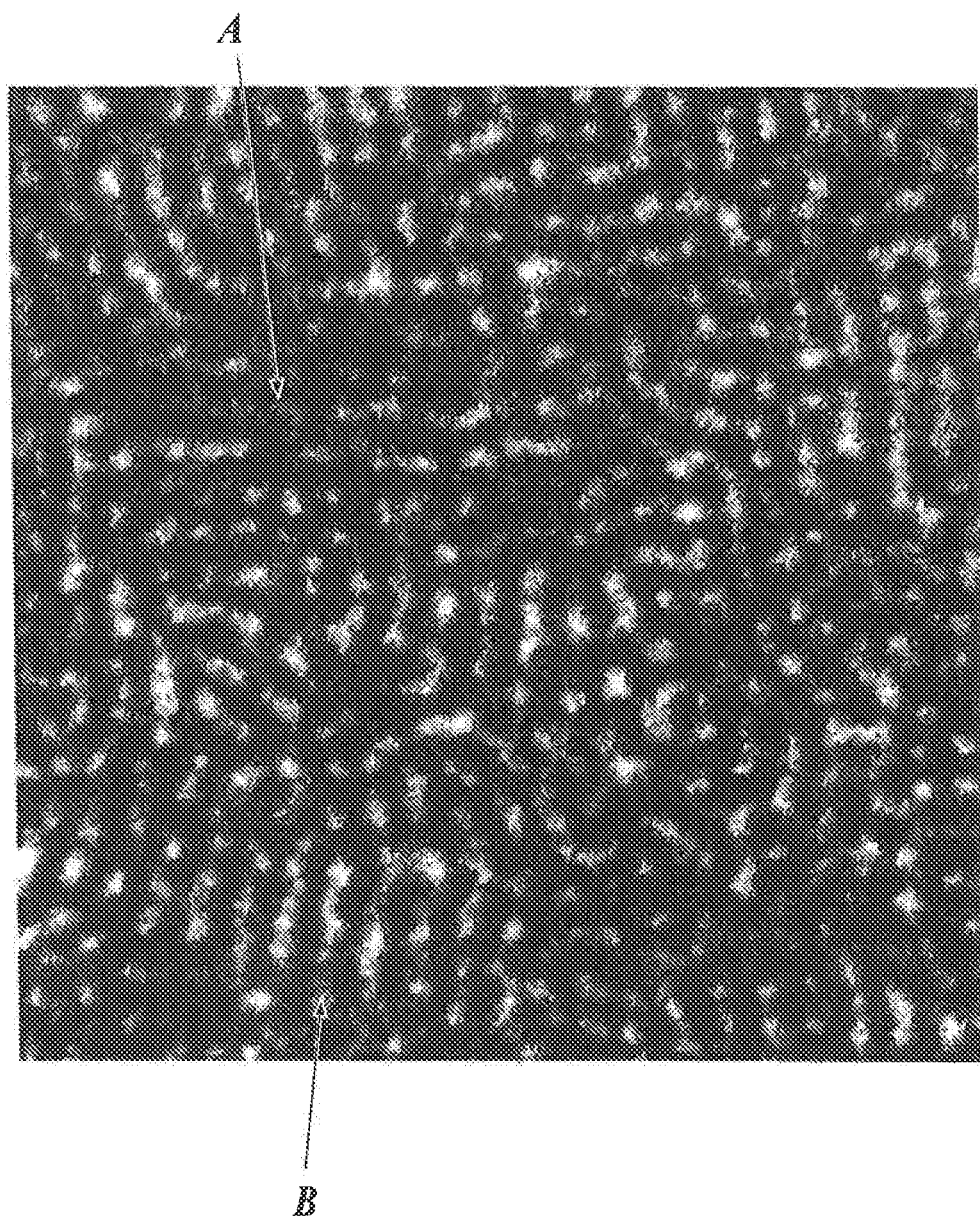
FIG. 12 is an image example reproduced using a conventional threshold matrix.
Figure 13:
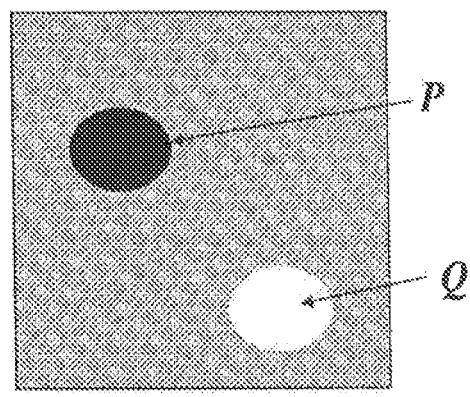
FIG. 13 is a drawing for explaining a conventional threshold matrix, and FIG. 14 explains a moiré pattern.
Figure 14:
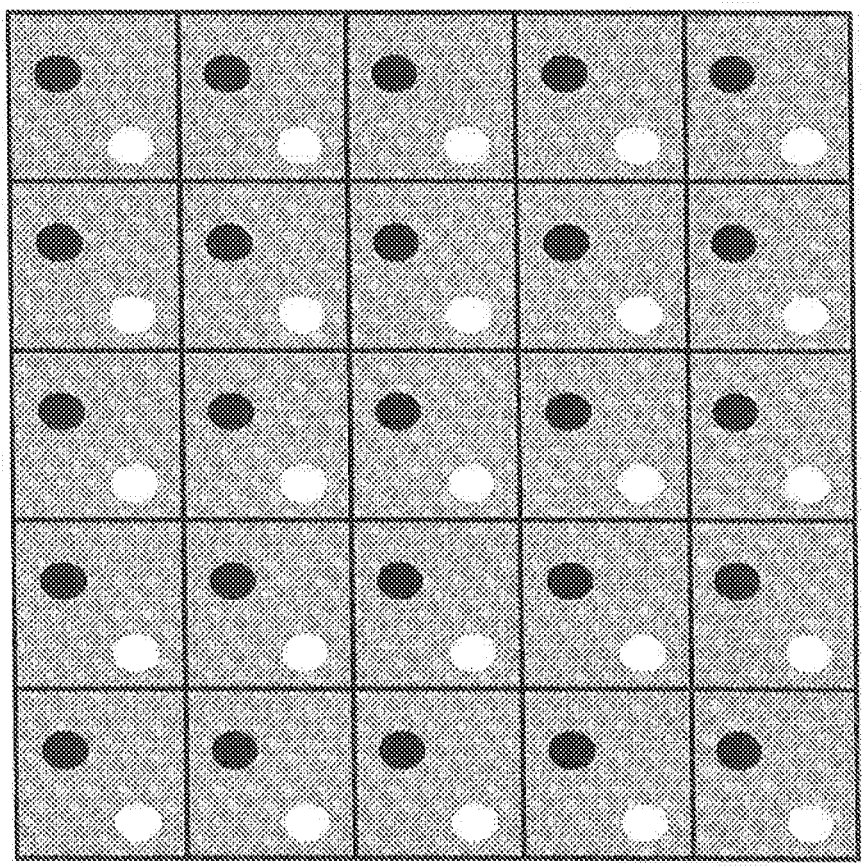

An example of a reproduced image using a threshold matrix generated as above is shown in FIG. 7. FIG. 7 is an image of a grid of dots having a tone value of 50% reproduced by a K color threshold matrix having a 128×128 pixels size generated by this exemplary embodiment. The ratio of the major axis to the minor axis of the elliptical frequency domain of the spatial frequency characteristics is set as 1.0:0.9. Compared with FIG. 7 and FIG. 12, it is apparent that collapse of the dots or white patch in the reproduced image using the threshold matrix generated by this exemplary embodiment is reduced compared with the image reproduced by the threshold matrix generated by a conventional method.

According to this exemplary embodiment, the image is resistant to occurrence of the moiré pattern because the sizes of the threshold matrixes for the Y, M, C and K colors for screening are different each other.

The principle to reduce production of the moiré pattern will be explained. An example of image formation by two-color screening is explained in the following explanation; however, the explanation can be applied to three or more colors screening in the same manner.

Figure 8:
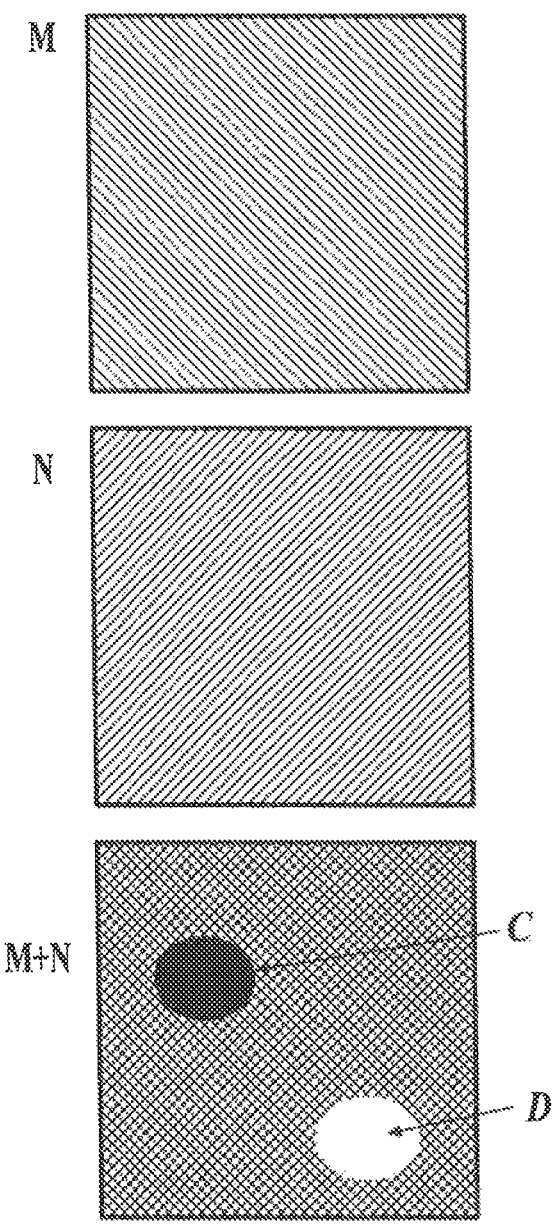
FIG. 8 illustrates an example of a reproduced image in which multiple colors are superimposed.

As shown in FIG. 8, when screen processing were performed for each color using threshold matrixes "M" and "N" having the same size and obtained color images were superimposed, a color image may be obtained in which a region "C" where color toners are overlapped and a region "D" where they are not overlapped are arranged locally, for example.

Figure 9:
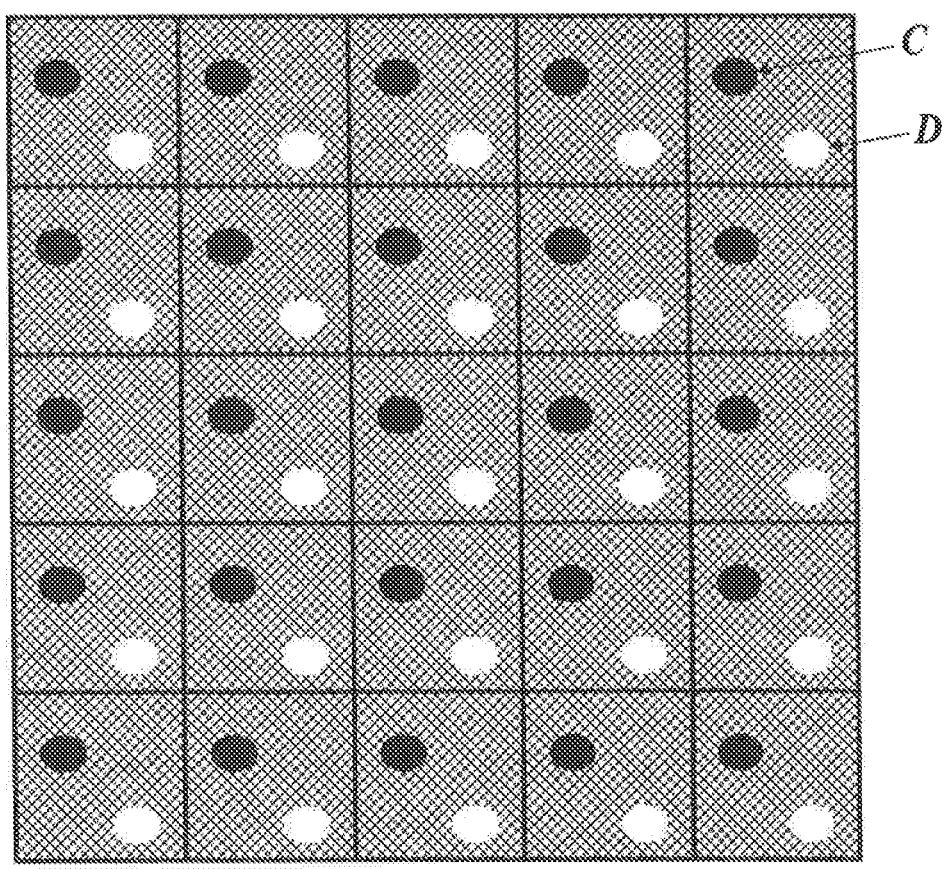
FIG. 9 is a drawing for explaining a moiré pattern.

Even when the threshold matrix that can improve collapse of the dots or white patch is used for color screening as explained in an exemplary embodiment, if sizes of the matrixes for the colors be the same, the region "C" where colors are overlapped and the region "D" where colors are not overlapped are periodically produced, as shown in FIG. 9, and they are recognized as a moiré pattern.

Figure 11:
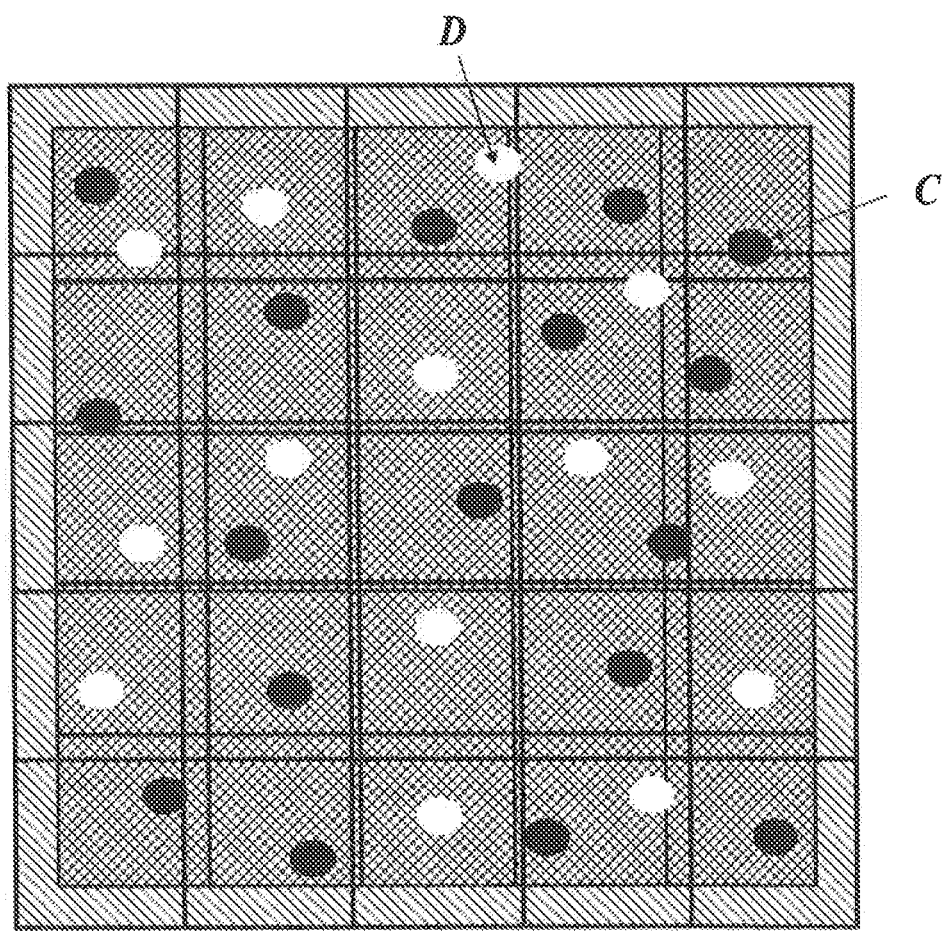
FIG. 11 is a schematic drawing of an image in which an image containing multiple colors is reproduced using threshold matrixes generated by an exemplary embodiment of the present invention.

According to this exemplary embodiment, as shown in FIG. 10, the threshold matrixes "R" and "S" having different sizes are used for screening of different colors. That is, screen processing are performed using the tiled threshold matrixes "R" and "S" for respective colors and obtained images are superimposed. Even if the region "C" where colors are overlapped and the region "D" where colors are not overlapped be locally produced, the periodicity of the repeated pattern becomes large and thus production of undesirable patterns such as a moiré pattern can be reduced as shown in FIG. 11. The effect becomes large as the lowest common multiple of the sizes of the threshold matrixes for the colors becomes large.

By virtue of the size setting of the threshold matrixes as explained above, even in the case where the arrangement period of the largest threshold matrix causes visual recognition of a periodic pattern, production of the moiré pattern can be effectively reduced.

Up to now, a large-sized threshold matrix was adopted for FM screening so as not to produce moiré pattern caused by the arrangement period. For example, a threshold matrix of 600 dpi having a size of 256×256 pixels, a side length exceeds 10 mm and a moiré pattern caused by the arrangement period is hard to be produced. However, it causes the necessity of large memory capacity to store such a large threshold matrix and thus it is difficult to adapt hardware and needs high cost.

On the other hand, when forming an image by using a threshold matrix of 1200 dpi having a size of 128×128 pixels, an arrangement period of the threshold matrix is approximately 2.7 mm and the size causes a tendency to produce a pattern that is visually recognized as a moiré pattern. However, by setting sizes of threshold matrixes for respective colors different each other so as to increase periodicity of a pattern, it becomes possible to reduce production of the moiré pattern effectively. Therefore, a size of the threshold matrix can be decreased to 10 mm or less by a side and memory capacity can be saved for storing the threshold matrix, resulting in cost reduction.

As explained above, according to this embodiment, the threshold matrix generation device 4 sets a ratio of a length along a main scanning direction to a length along a sub-direction based on a relation between image reproducibility in the main scanning direction and image reproducibility in the sub-direction of an image processing device for forming an image on a paper based on an image data obtained by the halftone processing. The threshold matrix generation device 4 determines spatial frequency characteristics having a frequency domain of an ellipse shape, a major axis and a minor axis of the ellipse having the ratio and corresponding to peak values. The threshold matrix generation device 4 determines a threshold value of each pixel of the threshold matrix in accordance with the determined spatial frequency characteristics. As a result, because it becomes possible to create a threshold matrix by taking dot reproducibility characteristics of an image processing device into consideration, dot collapse or white patch occurred by a screen processing can be reduced. Thus it becomes possible to output images by FM screen pattern with less moiré pattern for both of monochrome images and two or more compound-color images.

According to this embodiment, the relation between the reproducibility of an image in the main direction and the reproducibility of an image in the sub-direction is set as a ratio of line widths of thin line images along the main direction to that along the sub-direction formed on a paper by the image processing device 100 based on thin line image data having specified pixel widths running along the main direction and the sub-direction. As a result, it becomes possible to design a threshold matrix quantitatively and a design of a screen can be made easily.

According to this embodiment, each side of a threshold matrix can be 10 mm or less and thus a memory capacity to store the matrix can be reduced, resulting in the cost reduction.

According to this embodiment, the threshold matrix generation device 4 can generate threshold matrixes having different sizes in accordance with two or more colors that the image processing device 100 can reproduce. Thus, when images of two or more colors are superimposed and output, a moiré pattern visually recognized by periodical arrangement of regions where the colors are superimposed and regions where the colors are not superimposed can be reduced and preferable image reproduction can be realized.

The above explanation for this embodiment is an example of an image processing device of the present invention and does not limit the invention to this example. A detail structure or detailed function of the image processing device can be modified within the gist of the invention.

In this embodiment, the image processing device 100 includes the threshold matrix generation device 4 and a threshold matrix generated by the threshold matrix generation device 4 is provided to the screening portion 2. However, it may be possible that an image data generated by the controller 20 is screen processed using a threshold matrix above explained and the image processing device 100 creates an image based on the image data input from the controller 20. The threshold matrix generation device 4 may be incorporated in the controller 20 in such a case.

In this embodiment, the threshold matrix generation device 4 may be incorporated in the image processing device 100. However, the threshold matrix generation device of this embodiment may be installed in an information processing device such as a PC. A threshold matrix can be generated by the information processing device and data of the generated threshold matrix can be transferred to an image processing device.

It may be also possible to prepare a program for generating a threshold matrix and install the program in an information processing device such as a PC instead of the threshold matrix generation device of this embodiment.

In this embodiment, a ratio of the major axis to the minor axis of an ellipse for the spatial frequency characteristics was determined by two thin line widths running along the main scanning direction and the sub-direction. However, other methods for determining the ratio of major axis to the minor axis may be also possible.

In this embodiment, an image processing device 100 for forming four-color images of Y, M, C and K was used. However, it is possible to apply this method to an image processing device for monochrome images or two or more colored images.

In this embodiment, an image processing device 100 for forming images by an electro-photography system was used. However, it is possible to apply this method to an image processing device that forms images by other systems such as an inkjet system or an offset process.

In an exemplary embodiment, a hard disc or a nonvolatile semiconductor memory was used, as an example, as a computer readable medium for a program of the present invention. However, the invention is not limited to the examples. For example, a portable record memory such as a CD-ROM may be used as a computer readable medium. Furthermore, carrier wave may be used as a medium for providing a program data of the invention through a communication line.

The present U.S. application claims a priority under the Paris Convention of Japanese Patent Application No. 2011-149767 filed on Jul. 6, 2011, the disclosure of which is incorporated by reference in its entirety.

What is claimed is:

1. A threshold matrix generation device for generating a threshold matrix having a specified size for use of halftone processing of a multi-tone image data using a dithering method, wherein
   the device determines a ratio of a width of an image for defining reproducibility along a main scanning direction to a width of the image for defining reproducibility along a subscanning direction (sub-direction), the image for defining reproducibility obtained by the halftone processing,
   determines spatial frequency characteristics having a domain of an ellipse shape having set major axis and minor axis as peak values based on the widths of the image for defining reproducibility in the main scanning direction and the subscanning direction, and
   sets a threshold value of each pixel of the threshold matrix in accordance with the determined spatial frequency characteristics.

2. The threshold matrix generation device according to claim 1, wherein the image for defining reproducibility includes a thin line running along the main direction and a thin line running along the sub-direction, the ratio is a ratio of a width of the thin line running along the main direction to a width of the thin line running along the sub-direction.

3. The threshold matrix generation device according to claim 1, wherein a length of each side of the threshold matrix is not more than 10 mm.

4. The threshold matrix generation device according to claim 1, wherein the threshold matrix generation device can generate different threshold matrixes having different sizes with respect to each other, the matrixes correspond to two or more colors that the image processing device can reproduce.

5. The threshold matrix generation device of claim 1, wherein the threshold matrix is generated for a FM (frequency modulation) screen pattern for each of different colors and having a specified size for use of a halftone processing of a multi-tone color image data using a dithering method,
   wherein the size of the threshold matrix is the number of pixels in each column and row of the threshold matrix, and the threshold matrix generation device can generate different threshold matrixes having different sizes with respect to each other that correspond to the different colors.

6. A threshold matrix generation method for generating a threshold matrix having a specified size for use of a halftone processing of a multi-tone image data using a dithering method, comprising:
   generating a specified image for determining reproducibility on a paper using an image processing device that can form an image on a paper based on an image data obtained by the halftone processing,
   determining an image ratio of a width of the image for defining reproducibility formed in the image generating step along a main scanning direction to a width of the image for determining reproducibility formed in the image generating step along a sub-direction of the image processing device, and
   generating a threshold matrix by setting a matrix ratio of a length along the main direction to a length along the sub-direction based on the image ratio, by determining a spatial frequency characteristics of a domain of an ellipse shape having set major axis and minor axis as peak values based on the widths of the image for defining reproducibility in the main scanning direction and the subscanning direction, and by setting a threshold value of each pixel of the threshold matrix in accordance with the determined spatial frequency characteristics.

7. The threshold matrix generation method of claim 6, wherein the threshold matrix is generated for a FM (frequency modulation) screen pattern for each of different colors and having a specified size for use of a halftone processing of a multi-tone color image data using a dithering method, wherein the step of generating includes generating different threshold matrixes having different sizes each other corresponding to different colors, wherein the size of the threshold matrix is the number of pixels in each column and row of the threshold matrix.

* * * * *